July 3, 1956
L. C. HEATH ET AL
2,752,690
INSPECTION APPARATUS FOR ENGINEERING PARTS
Filed Nov. 28, 1955
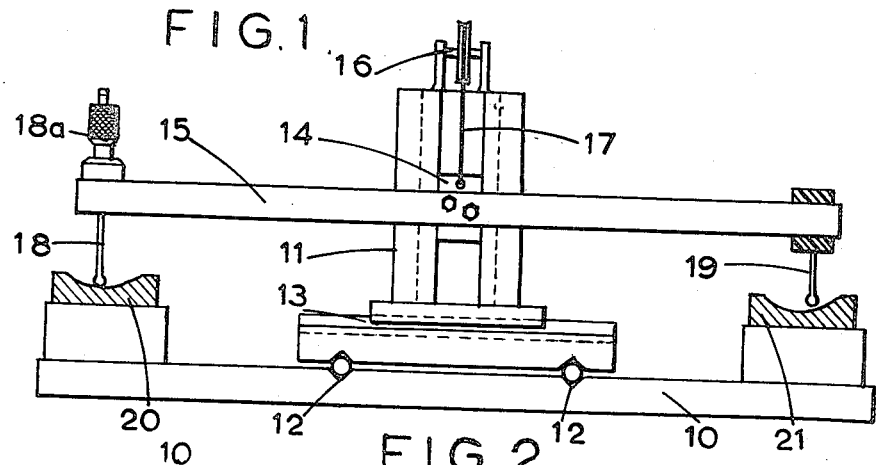
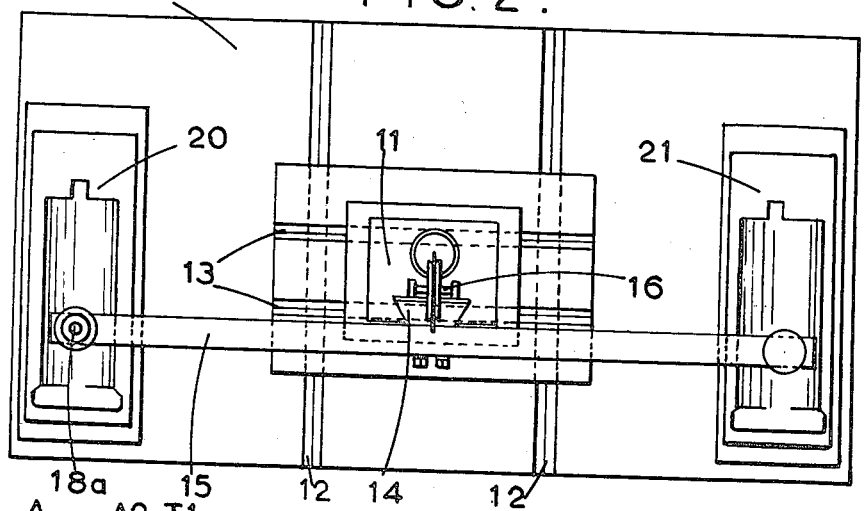
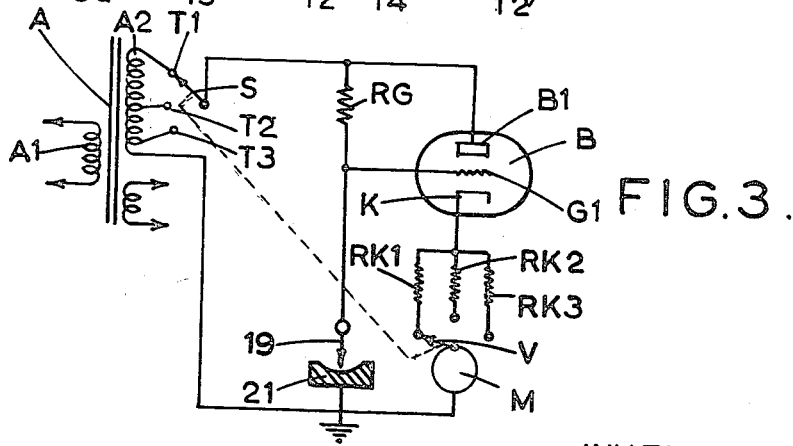
INVENTORS
Leonard Charles Heath
Alan William Birks
BY
Leech and Radue
ATTORNEYS

United States Patent Office 2,752,690
Patented July 3, 1956

2,752,690
INSPECTION APPARATUS FOR ENGINEERING PARTS

Leonard Charles Heath and Alan William Birks, Derby, England, assignors to Rolls-Royce Limited, Derby, England, a British company Application November 28, 1955, Serial No. 549,477

Claims priority, application Great Britain December 7, 1954

9 Claims. (Cl. 33—174)

This invention relates to inspection apparatus for engineering parts.

According to the present invention inspection apparatus for engineering parts comprises probe means and follower means inter-connected for correlated movement with respect to the engineering part to be inspected and a master part corresponding thereto, said probe means contacting the surface of one of said parts and the follower establishing a spark gap with the other part, which gap is connected in a spark-inducing circuit comprising means for indicating the extent of spark gap.

According to another aspect of the present invention inspection apparatus for engineering parts comprises a base plate including means supporting a probe and a follower which are mechanically interconnected for correlated movement with respect to the engineering part to be inspected, which part is mounted on the base plate in fixed correlation with a master part corresponding thereto also mounted on the base plate said probe means being arranged to contact the surface of one of said parts and the follower establishing a spark gap with the other part which gap is connected in a spark-inducing circuit comprising means for indicating the extent of the spark gap.

The master part may conform wholly to the shape of the part to be inspected or may merely provide a number of index points correlated with the shape of the engineering part. Preferably the probe means is arranged to contact the master part and the follower establishes a spark gap with the part to be inspected.

In accordance with a feature of the present invention the apparatus comprises a base plate having a pillar support mounted thereon on transverse slides, whereby said pillar support can be moved transversely and lengthwise of the plate in a horizontal plane, said pillar support additionally mounting for slidable movement in a vertical plane a transverse beam member, one end of which carries probe means and the other end of which carries follower means, said transverse and vertical sliding means confining the beam to positions parallel to the base plate.

The means for indicating the extent of the spark gap may comprise an electrical meter calibrated to give by the extent of its reading an indication of the actual length of the gap. Alternatively or additionally, the indicating means may comprise visual or aural means indicating that the extent of the gap is inside or outside prescribed limits.

Conveniently the spark-inducing circuit comprises a step-up transformer fed from the mains, for example to produce a voltage of the order of 1000, this voltage being fed through a series resistance to the spark gap established between the follower and associated part. The indicating means may comprise a triode valve, the anode of which is at the supply potential and the grid of which is connected on the downstream side of the series resistances and upstream of the spark gap. The cathode is connected through series resistances to a direct current meter. The spark inducing circuit and metering circuit preferably comprise means for adjusting the spark voltage and for adjusting the sensitivity of the meter. Thus for example ganged multi-position switches may be used selecting tappings on the transformer and selecting differing resistances in the metering circuit.

Apparatus according to the present invention may be particularly useful where the part to be inspected has surfaces which are at a substantial angle to one another. For example in the case of turbine blades and dies for casting or forging them surfaces on the root portion may be substantially at right angles to a surface of the profile portion. By the use of probe and follower means with ends of substantially spherical form the apparatus can be used to inspect such parts in one setting on the base plate.

A preferred embodiment of the invention is illustrated in the accompanying drawings in which:

Figure 1 is a side elevation of the apparatus.
Figure 2 is a plan view, and
Figure 3 is a diagram of a spark-inducing circuit.

Referring to Figures 1 and 2 the apparatus comprises a base plate 10 on which a pillar 11 is supported on cross-roller slides 12 and 13. A vertical slide 14 on the pillar carries a transverse beam member 15. In this manner the beam can be moved in a vertical plane in the slide 14 and transversely and lengthwise of the base plate 10 on slides 12 and 13 in a horizontal plane. Pillar 11 carries a pulley 16 over which a cable 17 passes, the cable being connected at one end to the transverse beam member 15 on the slide part thereof and at the other end to a counter-weight accommodated within the pillar 11.

The transverse beam supports at one end a probe 18 on a micrometer screw adjusting mechanism 18A and at the other end a follower 19, the follower 19 being electrically insulated from its support structure. The base plate supports a master profile part 20 and the part to be inspected 21 and these parts are set up on the base plate in relation to the probe 18 and follower 19, whereby in tracing the surface of the part 20 with the probe 18 the follower 19 passes over the corresponding surface on the part 21.

The follower 19 is connected in a spark-inducing circuit diagrammaticaly shown in Figure 3 which also indicates the part 21. In this figure a transformer A has its primary winding A1 connected to the mains supply. A secondary winding A2 has tappings T1, T2, T3 with a selector switch S. The selector switch connects to a gap resistance RG. The output voltage on the tapping T1 may be of the order of 1000 volts and that of T3 250 volts. The gap resistance is connected to the follower 19 to establish a spark gap with the surface of the part 21, which is earthed and connected to the earth connection of the secondary winding A2.

The means for indicating the extent of the spark gap comprises a thermionic tube B having its anode plate B1 connected to the spark supply circuit. The grid G1 of the tube is connected to a point between the gap resistance RG and the follower 19. The cathode K is connected through one of the resistances RK1, RK2, RK3 to a direct current meter M. A selector switch V which is ganged with the selector switch S is arranged to place either resistance RK1 or resistance RK2 or resistance RK3 in series with the meter M. The resistances are so chosen in relation to the spark voltage whereby when the high spark voltage, for example of 1000 volts, is applied, full scale reading of the meter M indicates a spark gap of approximately 0.005″. At the lower voltage tapping T3 the voltage may be of the order of 250 and the full scale reading of the meter M indicates a spark gap of the order of 0.001″.

It will be appreciated that in using the apparatus the follower can be set up in relation to the probe in such a manner as to give a preselected meter reading on a preselected master point. Thereafter the probe can trace the surface of the master part, whereby indications of the meter in the plus or minus sense from the preselected reading give an indication of the undersize or oversize of the part being inspected.

In place of a visual meter indication, lighting circuits may be used which are for example illuminated when the manufacturing error in the part inspected exceeds a predetermined amount, or the indication may be given aurally.

We claim:

1. Inspection apparatus for engineering parts which comprises a support for the part to be inspected, a support for a master part corresponding to said part to be inspected, a probe means adapted to contact the surface of one of said parts, a follower adapted to move over the other of said parts leaving a gap between said follower and said part, means interconnecting the probe and follower whereby the movement of the follower is correlated to that of the probe, an electrical circuit which includes said follower and said part associated with said follower so that when said circuit is made a spark will be produced across said gap, said circuit comprising electrical means for indicating the extent of such spark gap.

2. Inspection apparatus as claimed in claim 1 in which the probe means contacts the master part and the follower establishes a spark gap with the part to be inspected.

3. Inspection apparatus as claimed in claim 1 which comprises a base plate supporting said part to be inspected and said master part, a pillar, transverse slides whereby said pillar is mounted on said base plate for movement transversely and lengthwise of said plate in a horizontal plane, a beam member mounted on said pillar by means which allow said beam vertical movement with reference to said pillar, said beam carrying at one end said probe and at the other end said follower, said beam being confined to positions parallel to said base plate.

4. Inspection apparatus as claimed in claim 1 wherein the electrical circuit comprises a step up transformer whereby the voltage from a source of electrical energy is stepped up in the spark inducing circuit.

5. Inspection apparatus as claimed in claim 4 in which means are provided for varying in correlation the voltage of the spark inducing circuit and the sensitivity of the indicating device.

6. Inspection apparatus as claimed in claim 1 in which the electrical circuit comprises a step-up transformer, the primary of which is connected to a source of alternating current a triode valve comprising a cathode, a grid and an anode, the anode being connected to one side of the secondary of said transformer, a resistor connected from the anode to the grid, the spark gap being connected between the grid and the other side of the transformer secondary, a resistor and an indicating device connected in series between said cathode and the side of the spark gap connected to said other side of the transformer.

7. Inspection apparatus as claimed in claim 6 including means for varying the output voltage of the transformer and means for varying the sensitivity of the indicating means.

8. Inspection apparatus as claimed in claim 7 wherein the means for varying the output voltage of the transformer consists of tappings from the transformer secondary and the means for varying the sensitivity of the indicating means consists of a selector switch and a plurality of resistors adapted and arranged so that the resistor of appropriate value can be switched into circuit between the cathode and spark gap.

9. Inspection apparatus as claimed in claim 1 in which the probe and follower have substantially spherical ends.

No references cited.